Nov. 16, 1965     C. O. GLASGOW     3,217,922
HIGH PRESSURE–LOW PRESSURE SEAL ASSEMBLY
Original Filed Dec. 23, 1960     2 Sheets-Sheet 1

INVENTOR.
CLARENCE O. GLASGOW
BY Arthur R. Wade
ATTORNEY

Nov. 16, 1965 C. O. GLASGOW 3,217,922
HIGH PRESSURE-LOW PRESSURE SEAL ASSEMBLY
Original Filed Dec. 23, 1960 2 Sheets-Sheet 2

INVENTOR.
CLARENCE O. GLASGOW
BY
ATTORNEY

United States Patent Office 3,217,922
Patented Nov. 16, 1965

3,217,922
HIGH PRESSURE-LOW PRESSURE SEAL ASSEMBLY
Clarence O. Glasgow, Tulsa, Okla., assignor to National Tank Company, Tulsa, Okla., a corporation of Nevada
Original application Dec. 23, 1960, Ser. No. 77,929. Divided and this application Feb. 18, 1964, Ser. No. 347,071
1 Claim. (Cl. 220—46)

This application is a division of application Serial No. 77,929, filed December 23, 1960, now abandoned.

The present invention relates to pressure seals. More specifically, the invention relates to a seal which will seal a wide range of pressure.

Elastic metal rings have been used as seal structure within recesses formed between abutting flanges of containers. Containers is a term specifically used as including conduit, or pipe, through which fluids are moved under varying pressures and temperatures. Metal rings, properly formed and mounted, are generally more resistant to high temperature and pressure than plastic or deformable material such as the various types of rubber.

However, metal rings, not being deformable, do not function well as seal structure at relatively low pressure. There is need for a seal ring with the efficiency of a metallic ring at high pressures and temperatures and the efficiency of a seal structure utilizing the deformable properties of rubber-like material at low pressures and temperatures.

A principal object of the present invention is to utilize a form of recess between abutting flanges to give increased efficiency to the function of a metallic seal ring.

Another object is to use a combination of metallic seal structure and deformable material to increase the efficiency of sealing over a wide range of temperature and pressure.

Another object is to provide ready installation for a seal ring in operative position between abutting members without misalignment.

Another object is to eliminate a collection point for liquids which will result in corrosion of the metallic seal ring.

The present invention contemplates seal structure including a metallic ring of cross-sectional convex shape toward its center. The ring is positioned in recesses between abutting surfaces to be sealed, the recesses providing a wedge shape to engage the surfaces at the edges of the ring in a positive sealing relation along both edges and flat surfaces of the wedge.

The invention further contemplates a metallic seal ring embedded as a core within deformable material. The deformable material is energized by the pressure of fluids sealed to press against groove walls at low values of pressure and the metallic ring is further energized by high values of the pressure to also seal ring surfaces against the groove walls. The deformable material is, additionally, a protection for the metallic ring core during assembly and against corrosion in service.

Other objects, advantages and features of this invention will become apparent to one skilled in the art upon consideration of the written specification, appended claims, and attached drawings wherein;

Figure 1:
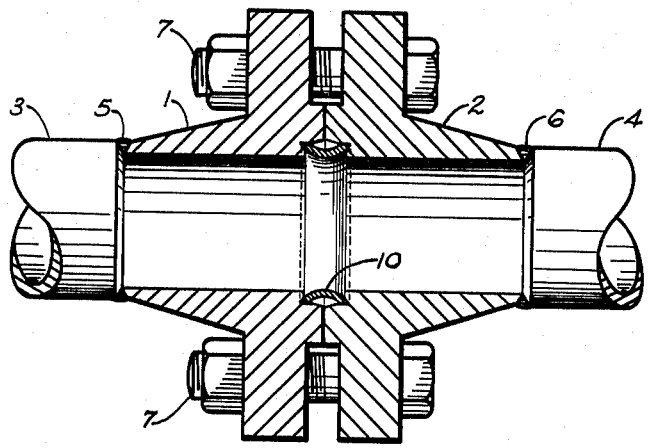
FIG. 1 is a partially sectioned elevation of a flange head assembly utilizing a metallic seal ring embodying the invention.

Referring to FIG. 1, there is illustrated a partially sectioned elevation of a pipe flange coupling in which the seal structure embodying this invention is mounted. The flange heads 1 and 2 are adapted to be welded to the ends of pipes 3 and 4. The weld is illustrated at 5 and 6. However, fixed to the ends of the pipes, the heads 1 and 2 are sealed together under the concept of this invention. Bolts 7 are representative of means bringing the flanges of the heads 1 and 2 together. Other means to bring the flanges together do not bear upon the basic novelty of the present invention. The split coupling, for this purpose, will be discussed infra.

Heads 1 and 2 abut each other as bodies defining a portion of the walls of a container for fluid pressure. Specifically, a continuous conduit is developed by abutting heads 1 and 2. However, broadly the conduit is accurately described as a container for the fluid pressure within. The seal embodying the present invention is mounted between the abutting heads.

The seal, as a combination, is characterized by ring 10. Broadly, ring 10 is positioned within a recess formed by aligning two grooves, each groove being formed in the abutting face of each flange head. The ring 10 is placed in the recess to engage particular surfaces of the grooves forming the recess. When correctly sized, the ring 10 will be placed under stress by the flange heads to concave inwardly. The resulting force developed to drive the edges of the ring 10 upon particular surfaces of the recess, develops the seal of the invention. Although the flanges of heads 1 and 2 are shown in FIG. 1 to be drawn together until they touch, the ring could be sized so as to be stressed by the flange heads enough to seal to the surfaces of the recess without the flanges actually being brought together as shown in FIG. 1.

Figure 2:
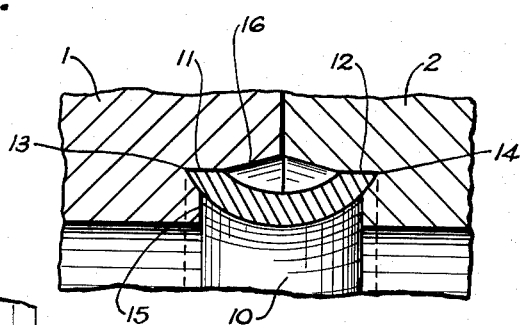
FIG. 2 is a sectioned enlargement of a portion of FIG. 1.

FIG. 2 shows the recess-ring relation to better advantage as the concept of the invention is developed. Considered in its entirety, ring 10 is circular about the axis of pipes 3 and 4. In FIG. 2 a section of this ring 10 has been taken in a plane containing the axis of the pipes. On such plane, the section of ring 10 projects as part of a cylinder. The cylinder portion is defined by a cord of the cylinder cross-section extending parallel of the axis of the pipes. The cross-section of the cylinder portion is then developed around the axis to define the body of the seal ring 10.

The flange head forces are then applied from opposite directions to the edges 13 and 14 to flex the ring and cause the ring to become more convex toward the axis of the pipes 3 and 4. Fluid pressure within the pipes acts outwardly, on the convex surface of ring 10 to add to the force applied to edges 13 and 14 and their adjacent surfaces. This fluid energization of the surfaces adjacent edges 13 and 14 helps carry out the objects of the invention. With this ring properly seated in the recess of the flange grooves, the objects of the invention are achieved. Sealing is provided between the flanges and the ring which is both effective and simple.

The provision of proper seating in the flange recess falls under the concept of the invention. Note that the grooves have very particular shapes to accommodate the ring 10 as described. Consider each flange groove separately. A simple right-angle cut will form wall 15 in the groove of flange 1. A second cut will provide the sloped wall 16. There then remains the cut which undercuts wall 15 to match the ring surface 11 and receive edge 13 in the resulting wedge-shaped portion of the groove. Edge 13 then slides under wall 15 in assembly to make the wedge engagement with this portion of the groove in flange 1. When both edges 13 and 14 are received in their respective grooves, the flanges are drawn together by bolts or clamping means. The positive, wedged, locked seal between ring 10 and the grooves of heads 1 and 2 exceeds the efficiency of prior art seals.

Increasing the internal pressure of the container sealed only increases the efficiency of the seal. The internal fluid pressure of the container acts on the convex surface of the ring 10 to seat edges 13 and 14 the more efficiently in their respective grooves. When the ring 10 is formed of the proper metal, temperature will not deteriorate the seal. In this manner the present invention provides a high pressure, high temperature seal of superior quality for flanges adapted to have grooves formed in them as disclosed.

The edges 13 and 14 may be given a high quality, uniform finish compatible with the precision and quality of the grooves in which the edges fit. In assembly, the sloped surfaces 16 are one measure to avoid damaging the important edges 13 and 14 to preserve their quality and uniformity.

Once edges 13 and 14 are in place, surfaces 11 and 12 against the groove walls and a finite portion of the convex side of ring 10 against the groove walls, the seal between these surfaces thereby becomes stable. The bowed body of the ring 10 may flex as the flange heads vary in the distance between them. However, the surfaces of the groove in contact with the surfaces on each side of edges 13 and 14 remain stable in their sealing function. The conditions which cause the ring to flex will not effect the stability of such seal.

Figure 3:
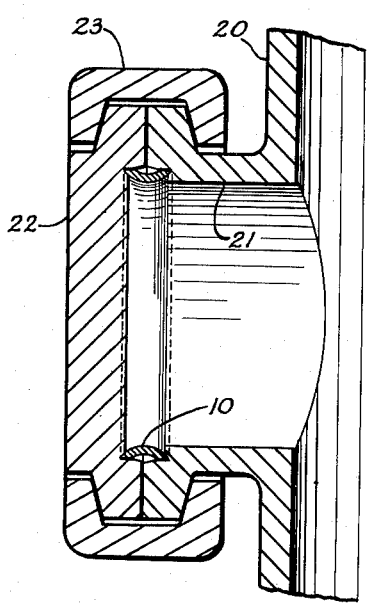
FIG. 3 is a sectioned elevation of a blind flange utilizing the seal of the invention.

FIG. 3 illustrates how the seal of the invention may be readily applied to seal a blind flange to a mating flange of a container. Container 20 has flange 21 mounted thereon. Blind flange 22 is a simple plate which can be grooved to accommodate ring 10. A simple two-piece clamping ring 23 can then bring blind flange 22 against flange 21 to complete the seal with ring 10. The accommodating grooves to form the recess for ring 10 are formed as illustrated in FIG. 2.

Figure 4:
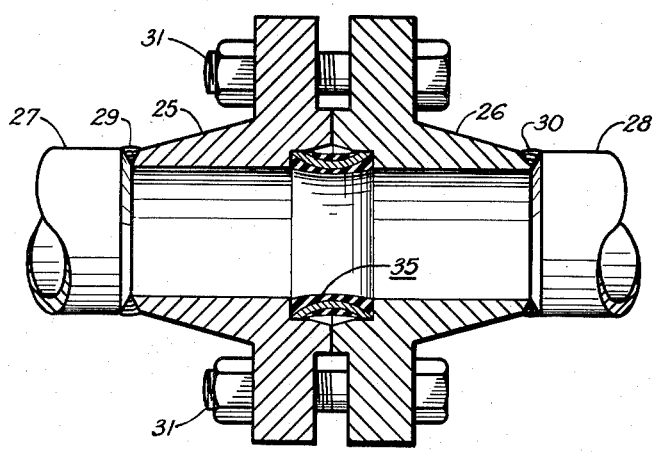
FIG. 4 is a view similar to FIG. 1 utilizing a combination metallic seal ring and encasing deformable material.

Referring now to FIG. 4 a simple, readily understood, modification of the seal of the preceding figures is illustrated. Flange heads 25, 26 and pipes 27, 28 are joined by welds 29, 30 after the manner illustrated in the structure of FIG. 1. Bolts 31 bring the flanges together, the seal of the invention between them. In the form of the seal ring employed, and the shape of its recess, there is some deviation from the structure of FIGS. 1–3. However, essential features of the invention are common denominators between these forms for the seal. The departures from the specific form of FIGS. 1–3, in FIGS. 4–6, supplement the foregoing features and add to them in extending the scope of the utility of this seal.

Seal ring 35 in FIG. 4 does not comprise merely the form of the metallic ring 10 of FIG. 1. In addition, deformable material has been bonded to its surfaces to achieve objects of the invention.

Figure 5:
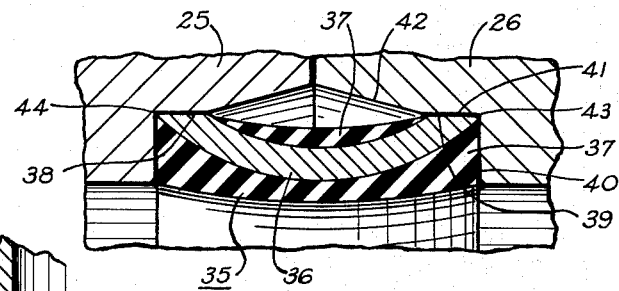
FIG. 5 is a sectioned enlargement of a portion of FIG. 4.

FIG. 5 shows ring 35 in its various components and its relation to the grooves of the flange faces, which abut each other. Ring 35 includes a metallic structure 36 of a shape similar to that given ring 10 of FIG. 2. However, in addition, a deformable material 37, such as plastic or rubber, has been formed about and bonded to, the ring surface. Material 37, in cross-section, is shown as essentially rectangular. The metallic ring 36, as a core, is encased in this deformable material.

Flat surfaces 38, 39 of ring 36 are covered with a thin coating of the material 37. The result is complete coverage of ring 36 by this material 37 and, correspondingly, protection for the metallic ring 36 during shipment and assembly.

The complete ring assembly 35 is positioned in the recess of the flange heads 25, 26. The ring 36 core is oriented in the recess as is ring 10 of FIGS. 1–3. However, the shape of the recess is a modification of the prior recess.

Figure 6:
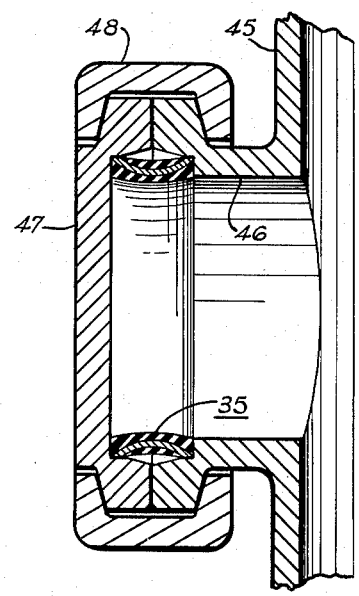
FIG. 6 is similar to FIG. 3 utilizing the seal ring of FIGS. 4 and 5.

The FIGS. 4–6 recess is formed by aligning the grooves of flange heads 25, 26. These grooves are of very simple form. Each groove is made by a simple right angle cut in the abutting faces of heads 25, 26. Walls 40, 41 are thereby formed at right angles to each other. A portion of the wall 41 is given an additional cut which leaves it at a slope as shown at 42. This slope 42 is similar to slope 16 in the FIGS. 1–3 form of grooves. So formed, the grooves are aligned to make up the recess receiving the ring 35. Metallic ring core 36 is oriented with its flat faces 38, 39 against walls 41 of their respective grooves. Edges 43, 44 are brought into the groove corners formed by right angled walls 40 and 41. With the flange heads 25, 26 brought together, a seal is developed between the material 37, edges 43, 44 and flat ring core surfaces 38, 39 and groove surfaces 41.

An advantage of the seal of FIGS. 4–6 is in its efficiency in sealing pressure by material 37 engaging groove wall 40 in combination with its efficiency to seal high pressure between the edges 43, 44 and flat surfaces 38, 39 with the groove corner and groove surface 41. FIG. 5 illustrates the effect of stress applied to the ring 35 by bringing flange heads 25, 26 toward each other with the ring 35 positioned in their grooves-recess.

The ring 35 can be seen as slightly flexed in FIG. 5. The ring core 36 is made more convex inwardly. The material 37 is deformed into a slight bulge beyond the internal walls of the flange heads 25, 26. Low values of pressure within the container, or conduit, of the heads 25, 26 will be sealed by material 37 engaging groove walls 40.

As the value of pressure sealed increases, the ring core 36 will receive this pressure on its convex side, inward of the container. Ring core 36 will tend to straighten out. So stressed, ring core 36 will seal the more efficiently against the groove corners and flat surfaces 41, with edges 43, 44 and flat surfaces 38, 39. Therefore, the ring 36 is a part of seal structure which is effective over a wide range of pressures.

The sloped walls 42 of the groove functions as sloped walls 16. Past this portion of the grooves, the ring 35 is readily assembled into its correct sealing position within the recess. Once in position, the material 37 functions to both seal at low pressures and bridge the gap the recess of the grooves leaves in the internal walls of the conduit formed by the abutting flange heads 25, 26. Liquid cannot form in stagnant pockets, or pools, within the recess to corrode the metal of the ring 35. Thus, the modification of the seal ring in FIGS. 4–6 has several advantages not obtained with the form of ring disclosed in FIGS. 1–3.

FIG. 6 shows a vessel wall 45, flange 46, blind flange 47 and coupling ring 48 adapted to utilize the seal ring 35. To the extent of this structure, the disclosure of FIG. 6 is to be compared with FIG. 3.

In connection with FIGS. 4–6, the complete encasement of ring core 36 with deformable material 37 is illustrated. However, it must be appreciated that the cooperation of this seal ring structure 35, with the particular groove illustrated, is not the limit of the disclosure. It is obviously practical to use seal ring 36 with the groove form developed in FIGS. 1–3. The metal-to-metal contact of the FIGS. 1–3 groove and ring core 36 can be extended by leaving the edges 43, 44 exposed from the material 37. The edges 43, 44 will then slip into the undercut wedge slope of the FIGS. 1–3 groove and provide the particular advantage of that seal contact without losing the seal contact advantage of the material against the groove walls.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

A seal assembly for both low and high pressures including;
- a container with an opening to be sealed and surrounded by a face having a continuous groove about the opening;
- a closure member with a face formed to abut the face about the opening and having a continuous groove in the face aligned with the first groove to form a recess shaped to receive a seal member;
- an elastic metallic seal member which is,
  - (a) in the general shape of a ring sized to be received in the recess formed about the container opening,
  - (b) formed in cross-section as the transverse cross-section of a cylindrical pipe, the ends of resulting arch defined by a cord of the pipe cross-section, and the cross-sectional shape being formed convex toward the pressure of the recess from internal the container; the flat surface at the ends sealing against flat surfaces within the recess;
- and deformable material bonded to the convex surface of the seal member and sized to extend into sealing engagement with surfaces of the recess on each groove.

References Cited by the Examiner

UNITED STATES PATENTS 2,303,114  11/1942  Egger _____ 277—236

FOREIGN PATENTS 911,682  3/1946  France.

LEWIS J. LENNY, *Primary Examiner.*

SAMUEL ROTHBERG, *Examiner.*